United States Patent [19]

Federle

[11] Patent Number: 4,644,230

[45] Date of Patent: Feb. 17, 1987

[54] FOCUS VOLTAGE CIRCUIT FOR TELEVISION APPARATUS

[75] Inventor: Steven P. Federle, Indianapolis, Ind.

[73] Assignee: RCA Corporation, Princeton, N.J.

[21] Appl. No.: 715,640

[22] Filed: Mar. 25, 1985

[51] Int. Cl.$^4$ .................. H01J 29/58; H01J 29/70
[52] U.S. Cl. ..................................... 315/382; 315/411
[58] Field of Search ............... 315/382, 382.1, 411; 358/218, 242, 190

[56] References Cited

U.S. PATENT DOCUMENTS 4,316,128 2/1982 Shiratsuchi ..................... 315/382

Primary Examiner—Theodore M. Blum
Assistant Examiner—Gregory C. Issing
Attorney, Agent, or Firm—Eugene M. Whitacre; Joseph J. Laks; Sammy S. Henig

[57] ABSTRACT

The retrace pulse voltage developed by a horizontal deflection generator is applied to the primary winding of a flyback transformer. The voltage across a high voltage winding of the flyback transformer is rectified and filtered to produce an intermediate, DC high voltage. The voltage developed across the flyback transformer primary winding produces a leakage flux that links the winding turns of a coil in a dynamic focus circuit. The coil and a capacitor form an LC resonant circuit that waveshapes the induced voltage in the coil to produce a sinusoidal or an approximately parabolically shaped horizontal frequency voltage. The intermediate DC high voltage and the parabolically shaped horizontal frequency voltage are summed to produce the focus voltage.

7 Claims, 3 Drawing Figures

U.S. Patent  Feb. 17, 1987  4,644,230
Fig.1
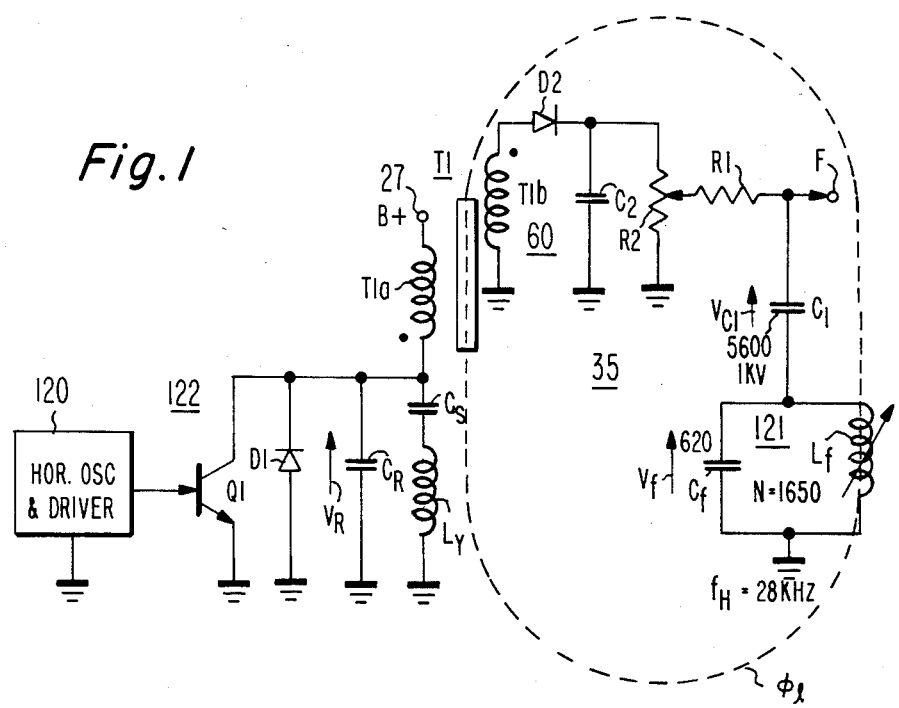
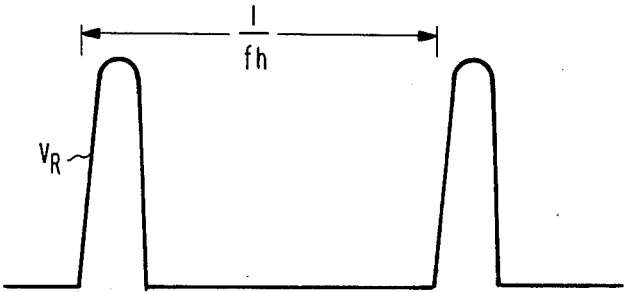
(a)
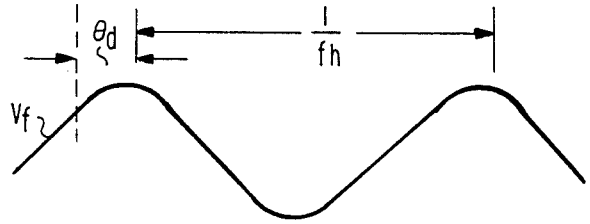
(b)
Fig.2

FOCUS VOLTAGE CIRCUIT FOR TELEVISION APPARATUS

This invention relates to modulated focus voltage circuits for television apparatus.

The need for focus control is well understood in the art. It was experienced early in television apparatus as an incident to the scanning of cathode-ray tubes because the distance from the center of deflection to the scanned raster is not uniform. Actually, that distance varies markedly as the beam is deflected horizontally and vertically from the central portion of the screen and, consequently, defocusing is most severe at the corners of the raster. The adoption of picture tubes of increased size and wider deflection angles in recent years has emphasized the defocusing effect at the corners of the scanning pattern.

Efforts have been made to control focus in electrostatically focused tubes by changing the magnitude of the focus potential with displacement of the beam from the center of the raster. This technique is referred to as dynamic focusing. It comprises the application of a unidirectional potential to the focus electrode of the electrostatically focused cathode-ray tube to establish the proper focus condition at the center of the raster and the concurrent application of a suitably varying potential to preserve that condition throughout the scanning raster. Since, in the usual case, the beam focus changes approximately in accordance with a parabolic function along either scanning direction, the varying components of focus potential may have a parabolic waveform in both axes. The art has learned that a focus potential of sinusoidal waveform may be a sufficiently close approximation to maintain the focus within practical tolerances.

In accordance with an aspect of the invention, a focus voltage circuit with deflection frequency modulation of the focus voltage includes a source of deflection frequency alternating polarity voltage. A transformer having a winding is coupled to the source for generating an alternating polarity flux in a coil. The flux in the coil comprises a significantly lesser portion of the flux in the transformer winding. The alternating polarity flux in the coil induces a corresponding voltage in the coil. The voltage that is induced in the coil is used for generating a deflection frequency focus voltage for coupling to a focus electrode.

In a focus voltage generating circuit, embodying another aspect of the invention, a retrace pulse voltage developed by a horizontal deflection generator is applied to the primary winding of a flyback transformer. The deflection generator produces an alternating polarity leakage flux in a space outside the core of the flyback transformer. An inductor or coil is coupled to a portion of the flux produced by the primary winding. The coil may be located in the space outside the core of the flyback transformer. The voltage developed across the coil by the leakage flux, that is produced by the flyback transformer, is waveshaped to produce a sinusoidally or an approximately parabolically shaped horizontal frequency voltage used for dynamic focus. Thus the transfer of a deflection frequency energy to the focus electrode from the deflection generator is substantially accomplished via the alternating polarity leakage flux.

In accordance with yet another aspect of the invention, the coil is coupled to a capacitor to form an LC tuned circuit that waveshapes the voltage developed across the coil to produce the sinusoidal voltage used for dynamic focus. Thus, the inductance of the coil provides the entire inductance of the LC tuned circuit.

In accordance with still another aspect of the invention, the focus coil is adjustable so that the phase of the sinusoidal voltage relative to the phase of the deflection current in the deflection generator can be adjusted.

An advantage of the focus voltage generating circuit embodying the invention is in its simplicity. That is to say, the number of additional electrical components needed exclusively for generating the focus voltage is small. For example, in a circuit that generates, a horizontal parabolic voltage only, the additional components used for providing the horizontal rate focus voltage includes the focus coil and a capacitor that resonates with the focus coil at the horizontal frequency. An additional advantage is that such horizontal rate focus voltage is obtained with a minimal dissipation of additional power. Because of the loose, or weak, coupling between the flyback transformer and the focus coil, the disturbance caused by the sinusoidal current in the focus coil to the deflection generator current is, advantageously, small.

It should be understood that the sinusodially or the approximately parabolically shaped horizontal frequency voltage may be, advantageously summed with an already summed direct current high voltage and a parabolically shaped vertical frequency voltage to provide improved beam focusing at the right and left sides of the scanned raster and at the top and bottom sides of the scanned raster.

FIG. 1 illustrates a horizontal deflection circuit including a focus voltage circuit embodying the invention; and FIGS. 2a and 2b illustrate waveforms associated with the circuit of FIG. 1.

In a horizontal deflection circuit 20, illustrated in FIG. 1, a source of a voltage B+, illustratively, a direct current voltage, is developed at a terminal 27 that is coupled to one end of a primary winding T1a of an input or flyback transformer T1. The other end of primary winding T1a is coupled to a horizontal deflection generator 122 at the collector electrode of a horizontal output transistor Q1. Horizontal deflection generator 122 comprises a horizontal oscillator and driver 120, horizontal output transistor Q1, a damper diode D1, a retrace capacitor $C_R$, and the series arrangement of an S-shaping capacitor $C_S$ and a horizontal deflection winding $L_Y$.

A dynamic or modulated focus voltage is developed between a terminal F and ground by a focus circuit 35. Terminal F is coupled to the focus electrode of a picture tube, not shown. Coupled between terminal F and ground is the series arrangement of two capacitors, $C_1$ and $C_f$. An intermediate, substantially direct current high voltage $V_{C1}$ is developed across capacitor $C_1$ by a DC circuit 60. A substantially parabolically shaped horizontal frequency voltage is developed across capacitor $C_f$ by a circuit 121. The modulated focus voltage developed at terminal F, therefore, comprises the sum of the voltages developed across capacitors $C_1$ and $C_f$.

To develop the intermediate, DC high voltage across capacitor $C_1$, the retrace pulse voltage developed across flyback transformer winding T1b is rectified by diode D2 and filtered by a capacitor $C_2$ to produce a relatively large DC voltage across the capacitor. A voltage divider comprising a resistor R2 is coupled across capacitor $C_2$. The wiper arm of resistor R2 is coupled through a resistor R1 to capacitor $C_1$ at terminal F, thereby producing the intermediate DC high voltage across capacitor $C_1$.

To produce a substantially parabolically shaped horizontal frequency focus voltage $V_f$ across capacitor $C_f$, capacitor $C_f$ is coupled in parallel with an inductor or coil $L_f$, thus forming a resonant circuit 121.

In accordance with an aspect of the invention, retrace pulse voltage $V_R$, having the waveform shown in FIG. 2a that is developed across flyback transformer winding T1a of FIG. 1 creates a leakage flux $\phi_l$ that is coupled to coil $L_f$. Coil $L_f$ is, illustratively, located in a space outside transformer T1 but at a close proximity to it. Thus, coil $L_f$ is, illustratively, not wound around the same core of windings T1a and T1b. In order to obtain the desired flux $\phi_l$ amplitude in focus coil $L_f$, it is desirable to have the longitudinal axis of focus coil $L_f$ aligned in parallel with the corresponding axis of winding T1a of transformer T1, as shown schematically in FIG. 1. Also, it should be understood that flyback transformer T1 should be constructed, preferably, without a magnetic shield that may substantially reduce flux $\phi_l$.

Air leakage flux $\phi_l$ induces a corresponding voltage in coil $L_f$. The induced voltage in coil $L_f$ is sinusoidally or resonantly wave shaped by capacitor $C_f$ and the inductance of coil $L_f$ to produce the required sinusoidally or approximately parabolically shaped voltage $V_f$ across capacitor $C_f$, as illustrated in FIG. 2b.

With capacitor $C_f$ series arranged with capacitor $C_1$, the modulated focus voltage applied to terminal F comprises the sum of the parabolically shaped horizontal frequency voltage developed across capacitor $C_f$ and the direct current high voltage $V_{C1}$, previously discussed.

As described, modulated focus voltage circuit 121 consumes very small amount of power. This is so because the energy used by resonant circuit 121 obtained from magnetic leakage flux $\phi_l$ is substantially used only for supporting energy losses in $L_C$ resonant circuit 121.

In accordance with another aspect of the invention, the phase $\theta_d$ of voltage $V_f$ of FIG. 2b across capacitor $C_f$ of FIG. 1, relative to retrace voltage $V_R$ of FIG. 2a may be controlled by tuning the inductance of coil $L_f$ of FIG. 1, thus producing appropriately phased focus voltage $V_f$ relative to the deflection current in deflection winding $L_Y$.

What is claimed is:

1. A focus voltage circuit with deflection frequency modulation of the focus voltage, comprising:
   a source of deflection frequency alternating polarity voltage providing deflection frequency energy to a focus electrode;
   a transformer having a winding coupled to said source for generating an alternating polarity leakage flux in a space outside of said transformer;
   an inductance that is located in said outside space, wherein said alternating polarity leakage flux induces a corresponding voltage in said inductance; and
   means for generating from the voltage that is induced in said inductance, a deflection frequency focus voltage for said focus electrode, wherein the transfer of said deflection frequency energy to said focus electrode from said source is substantially accomplished via said alternating polarity leakage flux.

2. The circuit according to claim 1 wherein said inductance is variable for varying the phase of said deflection frequency focus voltage relative to said alternating polarity voltage.

3. The circuit according to claim 1 wherein said deflection frequency is a horizontal frequency.

4. The circuit according to claim 1 wherein said horizontal frequency focus voltage is summed up with a further voltage to provide the focus voltage for said focus electrode.

5. The circuit according to claim 1 further comprising a capacitance that forms a tuned resonant circuit with said inductance.

6. The circuit according to claim 5 wherein said deflection frequency focus voltage is developed across said capacitance.

7. A focus voltage circuit with deflection frequency modulation of the focus voltage, comprising:
   a source of deflection frequency alternating polarity voltage;
   a coil;
   a transformer having a winding coupled to said source for generating an alternating polarity flux in said coil, wherein said flux comprises a significantly lesser portion of the flux in said transformer winding and wherein said alternating polarity flux in said coil induces a corresponding voltage in said coil; and
   means for generating from the voltage that is induced in said coil by said alternating polarity flux, a deflection frequency focus voltage for coupling to a focus electrode.

* * * * *